(12) United States Patent
Zwierzynski et al.

(10) Patent No.: US 12,395,568 B2
(45) Date of Patent: Aug. 19, 2025

(54) SYSTEMS AND METHODS TO DETERMINE THE LOSS OF ABILITY TO NOTIFY CUSTOMER THROUGH MOBILE APP AND PROMPT RE-DOWNLOAD

(71) Applicant: Capital One Services, LLC, McLean, VA (US)

(72) Inventors: Jason Zwierzynski, McLean, VA (US); Sara Rose Brodsky, McLean, VA (US); Jennifer Kwok, McLean, VA (US); Joshua Edwards, Philadelphia, PA (US); Abhay Donthi, McLean, VA (US); Tania Cruz Morales, McLean, VA (US)

(73) Assignee: CAPITAL ONE SERVICES, LLC, McLean, VA (US)

( * ) Notice: Subject to any disclaimer, the term of this patent is extended or adjusted under 35 U.S.C. 154(b) by 206 days.

(21) Appl. No.: 17/888,189

(22) Filed: Aug. 15, 2022

(65) Prior Publication Data
US 2024/0056511 A1 Feb. 15, 2024

(51) Int. Cl.
*H04L 67/55* (2022.01)
*H04L 9/40* (2022.01)
*H04L 41/0654* (2022.01)
*H04L 67/54* (2022.01)

(52) U.S. Cl.
CPC .......... *H04L 67/55* (2022.05); *H04L 41/0654* (2013.01); *H04L 63/0815* (2013.01); *H04L 67/54* (2022.05)

(58) Field of Classification Search
CPC ..... H04L 67/55; H04L 67/54; H04L 41/0654; H04L 63/0815; H04L 63/10; H04L 67/75; G06F 8/61
See application file for complete search history.

(56) References Cited

U.S. PATENT DOCUMENTS

| | | | |
|---|---|---|---|
| 6,999,993 B1 * | 2/2006 | Shah | H04L 67/565 |
| | | | 709/224 |
| 7,650,382 B1 * | 1/2010 | Sobel | G06Q 10/107 |
| | | | 709/224 |
| 8,547,872 B2 | 10/2013 | Raleigh | |
| 9,584,624 B2 | 2/2017 | McCormick et al. | |
| 10,051,444 B2 | 8/2018 | Chiussi et al. | |
| 10,152,211 B2 | 12/2018 | Koushik et al. | |
| 10,212,104 B1 * | 2/2019 | Bhatt | H04L 51/02 |

(Continued)

FOREIGN PATENT DOCUMENTS

CA 2 692 741 4/2018

*Primary Examiner* — Muhammad Raza
(74) *Attorney, Agent, or Firm* — HUNTON ANDREWS KURTH LLP

(57) ABSTRACT

Systems and methods for detecting and repairing loss of a primary digital communication channel may include a server and a user device. The server may be configured to send a push notification to an application of the user device over a network, receive, in response to the sending of the push notification, push notification status data, apply a predictive model to determine whether the primary digital communication channel has failed based on the push notification and the push notification status data; and transmit, upon a determination that the primary digital communication channel has failed, a communication to the user over one or more alternative digital communication channels.

17 Claims, 7 Drawing Sheets

(56) References Cited

U.S. PATENT DOCUMENTS

| | | | |
|---|---|---|---|
| 10,652,782 B1* | 5/2020 | Korpi | G06N 3/042 |
| 11,405,511 B1* | 8/2022 | Ho | H04N 1/32096 |
| 2002/0198946 A1* | 12/2002 | Wang | H04L 41/0663 |
| | | | 709/206 |
| 2006/0183488 A1* | 8/2006 | Billhartz | H04W 24/00 |
| | | | 455/456.1 |
| 2008/0070526 A1* | 3/2008 | Donahue | H04L 51/58 |
| | | | 455/187.1 |
| 2008/0070602 A1* | 3/2008 | Donahue | H04W 4/14 |
| | | | 455/466 |
| 2008/0071866 A1* | 3/2008 | Donahue | G06Q 10/10 |
| | | | 709/204 |
| 2010/0325470 A1* | 12/2010 | Underwood | H04L 69/14 |
| | | | 709/239 |
| 2014/0181944 A1* | 6/2014 | Ahmed | H04L 67/04 |
| | | | 726/8 |
| 2016/0007083 A1* | 1/2016 | Gurha | H04N 21/25808 |
| | | | 725/13 |
| 2016/0066246 A1* | 3/2016 | Green | H04L 51/046 |
| | | | 455/445 |
| 2017/0098195 A1* | 4/2017 | Douglas | G06Q 10/1093 |
| 2017/0244798 A1* | 8/2017 | DeLuca | H04W 4/20 |
| 2018/0097764 A1* | 4/2018 | Lutsenko | H04L 51/224 |
| 2018/0145871 A1* | 5/2018 | Golin | H04L 51/48 |
| 2020/0250812 A1* | 8/2020 | Ceccaldi | G06V 10/82 |
| 2020/0261808 A1* | 8/2020 | Joshua | A63F 13/35 |
| 2020/0358664 A1* | 11/2020 | King | G06N 20/00 |
| 2021/0019732 A1* | 1/2021 | Gulchenko | G06Q 20/385 |
| 2021/0065576 A1* | 3/2021 | Lillie | G06F 9/50 |
| 2021/0173767 A1* | 6/2021 | Zhang | G06F 16/211 |

* cited by examiner

SYSTEMS AND METHODS TO DETERMINE THE LOSS OF ABILITY TO NOTIFY CUSTOMER THROUGH MOBILE APP AND PROMPT RE-DOWNLOAD

FIELD OF THE DISCLOSURE

The present disclosure relates to systems and methods for determining the loss of ability to notify a user through a preferred communication channel and reestablishing the preferred communication channel.

BACKGROUND

The ability for a business to digitally communicate with a customer is always beneficial and often necessary. For example, being able to make recommendations or provide other timely information to customers is advantageous, while timely notification of potential fraud is often critical. However, due to rapidly changing technologies and other similar reasons, businesses can struggle to maintain these digital lines of communication with customers. Often, businesses send information and messages through these digital lines of communication with no real understanding of whether the communications are ultimately reaching the customer. Maintenance of preferred digital lines of communication are necessary, but often overlooked.

These and other deficiencies exist. Accordingly, there is a need for monitoring primary lines of digital communication and being able to reestablish those lines of communication should they break down.

SUMMARY OF THE DISCLOSURE

Embodiments of the present disclosure provide a method for detecting and repairing the loss of a primary digital communication channel. The method may include delivering a push notification to an application of a user device over a network from a server, receiving, by the server and in response to the delivery of the push notification, push notification status data applying, by the server, a predictive model to determine whether the primary digital communication channel has failed based on the push notification and the push notification status data, and transmitting, by the server upon a determination that the primary digital communication channel has failed, a communication to the user over one or more alternative digital communication channels.

Embodiments of the present disclosure provide a system for detecting and repairing the loss of a primary digital communication channel. The system may include a server and a user device. The server may be configured to deliver a push notification to an application of the user device over a network, receive, in response to the delivery of the push notification, push notification status data, apply a predictive model to determine whether the primary digital communication channel has failed based on the push notification and the push notification status data; and transmit, upon a determination that the primary digital communication channel has failed, a communication to the user over one or more alternative digital communication channels Embodiments of the present disclosure provide a computer readable non-transitory medium comprising computer-executable instructions that are executed on a processor and comprising the steps of: delivering a push notification to an application of the user device over a network, receiving, in response to the delivery of the push notification, push notification status data, applying a predictive model to determine whether the primary digital communication channel has failed based on the push notification and the push notification status data; and transmitting, upon a determination that the primary digital communication channel has failed, a communication to the user over one or more alternative digital communication channels.

These and other objects, features and advantages of the exemplary embodiments of the present disclosure will become apparent upon reading the following detailed description of the exemplary embodiments of the present disclosure, when taken in conjunction with the appended claims.

BRIEF DESCRIPTION OF THE DRAWINGS

Various embodiments of the present disclosure, together with further objects and advantages, may best be understood by reference to the following description taken in conjunction with the accompanying drawings.

DETAILED DESCRIPTION

The following description of embodiments provides non-limiting representative examples referencing numerals to particularly describe features and teachings of different aspects of the invention. The embodiments described should be recognized as capable of implementation separately, or in combination, with other embodiments from the description of the embodiments. A person of ordinary skill in the art reviewing the description of embodiments should be able to learn and understand the different described aspects of the invention. The description of embodiments should facilitate understanding of the invention to such an extent that other implementations, not specifically covered but within the knowledge of a person of skill in the art having read the description of embodiments, would be understood to be consistent with an application of the invention.

The present invention provides systems and methods by which businesses may monitor preferred channels of communication with customers, generally through a business's application on a customer's device, and predict when those channels of communication are no longer functional. The present invention may also be capable of predicting the root cause of the broken communication channel.

Further, the present invention may be capable of attempting to repair the preferred communication channel in a variety of different ways, tailored to the specific set of circumstances including an understanding of the reason why the preferred communication channel was severed. The system may repair the preferred communication channel by sending attempted communications through secondary digital communication channels, these communications including instructions, links, tokens, and other tools to help a customer reestablish the preferred communication channel. Once a customer acknowledges any of the secondary communication attempts and provides assurance and/or evidence that the preferred digital communication channel is operative, the system may resume use of the preferred digital communication channel with the understanding that the communication channel is functional.

Further, a machine learning algorithm employed by the systems and methods for detecting and repairing the loss of a primary digital communication channel promotes system efficiency by reducing the demands on backend systems over time to improve the functioning of computers and conserve system resources.

Figure 1:
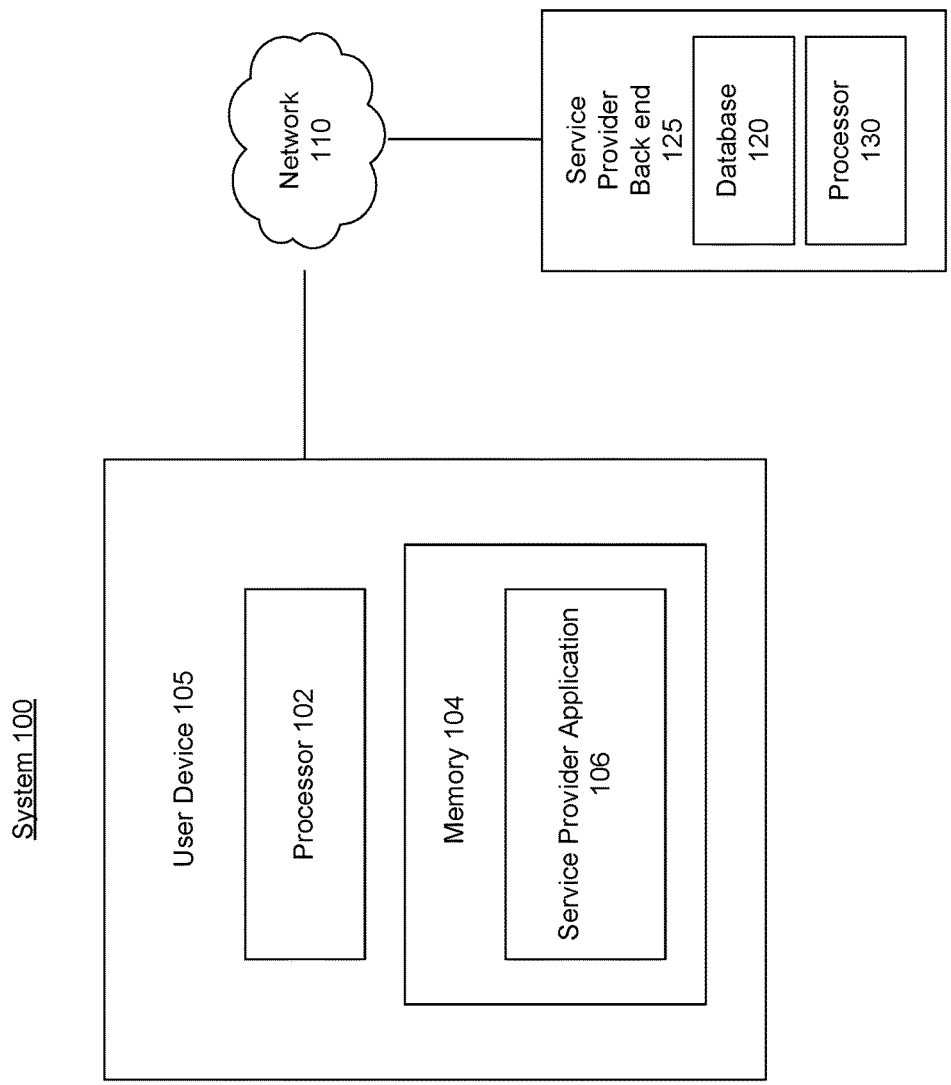
FIG. 1 illustrates a system for detecting and repairing loss of a primary digital communication channel according to an exemplary embodiment.

FIG. 1 illustrates a system 100 for determining and repairing a broken primary communication link between a service provider and user. The system 100 may include a device 105, a network 110, and a service provider backend 125. Although FIG. 1 illustrates single instances of components of system 100, system 100 may include any number of components.

System 100 may include a user device 105. The device 105 may include one or more processors 102 and memory 104. Memory 104 may include one or more applications, such as service provider application 106. The device 105 may be in data communication with any number of components of system 100. For example, the device 105 may transmit data via network 110 to processor 130 and/or database 120 of service provider backend 125. Without limitation, the device 105 may be a network-enabled computer. As referred to herein, a network-enabled computer may include, but is not limited to a computer device, or communications device including, e.g., a server, a network appliance, a personal computer, a workstation, a phone, a handheld PC, a personal digital assistant, a contactless card, a thin client, a fat client, an Internet browser, a kiosk, a tablet, a terminal, an ATM, or other device. The device 105 also may be a mobile device; for example, a mobile device may include an iPhone, iPod, iPad from Apple® or any other mobile device running Apple's iOS® operating system, any device running Microsoft's Windows® Mobile operating system, any device running Google's Android® operating system, and/or any other smartphone, tablet, or like wearable mobile device.

The device 105 may include processing circuitry and may contain additional components, including processors, memories, error and parity/CRC checkers, data encoders, anticollision algorithms, controllers, command decoders, security primitives and tamper-proofing hardware, as necessary to perform the functions described herein. The device 105 may further include a display and input devices. The display may be any type of device for presenting visual information such as a computer monitor, a flat panel display, and a mobile device screen, including liquid crystal displays, light-emitting diode displays, plasma panels, and cathode ray tube displays. The input devices may include any device for entering information into the user's device that is available and supported by the user's device, such as a touchscreen, keyboard, mouse, cursor-control device, touchscreen, microphone, digital camera, video recorder or camcorder. These devices may be used to enter information and interact with the software and other devices described herein.

System 100 may include a network 110. In some examples, network 110 may be one or more of a wireless networks, a wired network or any combination of wireless network and wired network, and may be configured to connect to any one of components of system 100. For example, the device 105 may be configured to connect to service provider backend 125 via network 110. In some examples, network 110 may include one or more of a fiber optics network, a passive optical network, a cable network, an Internet network, a satellite network, a wireless local area network (LAN), a Global System for Mobile Communication, a Personal Communication Service, a Personal Area Network, Wireless Application Protocol, Multimedia Messaging Service, Enhanced Messaging Service, Short Message Service, Time Division Multiplexing based systems, Code Division Multiple Access based systems, D-AMPS, Wi-Fi, Fixed Wireless Data, IEEE 802.11b, 802.15.1, 802.11n and 802.11g, Bluetooth, NFC, Radio Frequency Identification (RFID), Wi-Fi, and/or the like.

In addition, network 110 may include, without limitation, telephone lines, fiber optics, IEEE Ethernet 902.3, a wide area network, a wireless personal area network, a LAN, or a global network such as the Internet. In addition, network 110 may support an Internet network, a wireless communication network, a cellular network, or the like, or any combination thereof. Network 110 may further include one network, or any number of the exemplary types of networks mentioned above, operating as a stand-alone network or in cooperation with each other. Network 110 may utilize one or more protocols of one or more network elements to which they are communicatively coupled. Network 110 may translate to or from other protocols to one or more protocols of network devices. Although network 110 is depicted as a single network, it should be appreciated that according to one or more examples, network 110 may comprise a plurality of interconnected networks, such as, for example, the Internet, a service provider's network, a cable television network, corporate networks, such as credit card association networks, and home networks.

System 100 may include service provider backend 125 which may comprise one or more servers. In some examples, the one or more servers may include one or more processors, represented as processor 130 and coupled to memory, represented as database 120. The server(s) may be configured as a central system, server or platform to control and call various data at different times to execute a plurality of workflow actions.

In some examples, the server(s) can be a dedicated server computer, such as bladed servers, or can be personal computers, laptop computers, notebook computers, palm top computers, network computers, mobile devices, wearable devices, or any processor-controlled device capable of supporting the system 100. While FIG. 1 illustrates a single server, it is understood that other embodiments can use multiple servers or multiple computer systems as necessary or desired to support the users and can also use back-up or redundant servers to prevent network downtime in the event of a failure of a particular server.

The server may include an application in memory comprising instructions for execution thereon. For example, the application may comprise instructions for execution on the server. The application may be in communication with any components of system 100. For example, the server may execute one or more applications that enable, for example, network and/or data communications with one or more components of system 100 and transmit and/or receive data. Without limitation, the server may be a network-enabled computer. As referred to herein, a network-enabled computer may include, but is not limited to a computer device, or communications device including, e.g., a server, a network appliance, a personal computer, a workstation, a phone, a handheld PC, a personal digital assistant, a contactless card, a thin client, a fat client, an Internet browser, or other device. The server also may be a mobile device; for example, a mobile device may include an iPhone, iPod, iPad from Apple® or any other mobile device running Apple's iOS® operating system, any device running Microsoft's Windows® Mobile operating system, any device running Google's Android® operating system, and/or any other smartphone, tablet, or like wearable mobile device.

The server may include processing circuitry and may contain additional components, including processors, memories, error and parity/CRC checkers, data encoders, anticollision algorithms, controllers, command decoders, security primitives and tamper-proofing hardware, as necessary to perform the functions described herein. The server may further include a display and input devices. The display may be any type of device for presenting visual information such as a computer monitor, a flat panel display, and a mobile device screen, including liquid crystal displays, light-emitting diode displays, plasma panels, and cathode ray tube displays. The input devices may include any device for entering information into the user's device that is available and supported by the user's device, such as a touch-screen, keyboard, mouse, cursor-control device, touch-screen, microphone, digital camera, video recorder or camcorder. These devices may be used to enter information and interact with the software and other devices described herein.

System 100 may include one or more databases 120. The database 120 may comprise a relational database, a non-relational database, or other database implementations, and any combination thereof, including a plurality of relational databases and non-relational databases. In some examples, the database 120 may comprise a desktop database, a mobile database, or an in-memory database. Further, the database 120 may be hosted internally by any component of system 100 or the database 120 may be hosted externally to any component of the system 100 by a cloud-based platform, or in any storage device that is in data communication with the device 105 and backend 125. In some examples, database 120 may be in data communication with any number of components of system 100. For example, the processor 102 in data communication with the application 106 may be configured to transmit one or more requests for the requested data from database 120 via network 110.

In some examples, exemplary procedures in accordance with the present disclosure described herein can be performed by a processing arrangement and/or a computing arrangement (e.g., computer hardware arrangement). Such processing/computing arrangement can be, for example entirely or a part of, or include, but not limited to, a computer/processor that can include, for example one or more microprocessors, and use instructions stored on a computer-accessible medium (e.g., RAM, ROM, hard drive, or other storage device). For example, a computer-accessible medium can be part of the memory of the device 105, and/or database 120, or other computer hardware arrangement.

In some examples, a computer-accessible medium (e.g., as described herein above, a storage device such as a hard disk, floppy disk, memory stick, CD-ROM, RAM, ROM, etc., or a collection thereof) can be provided (e.g., in communication with the processing arrangement). The computer-accessible medium can contain executable instructions thereon. In addition or alternatively, a storage arrangement can be provided separately from the computer-accessible medium, which can provide the instructions to the processing arrangement so as to configure the processing arrangement to execute certain exemplary procedures, processes, and methods, as described herein above, for example.

Figure 2:
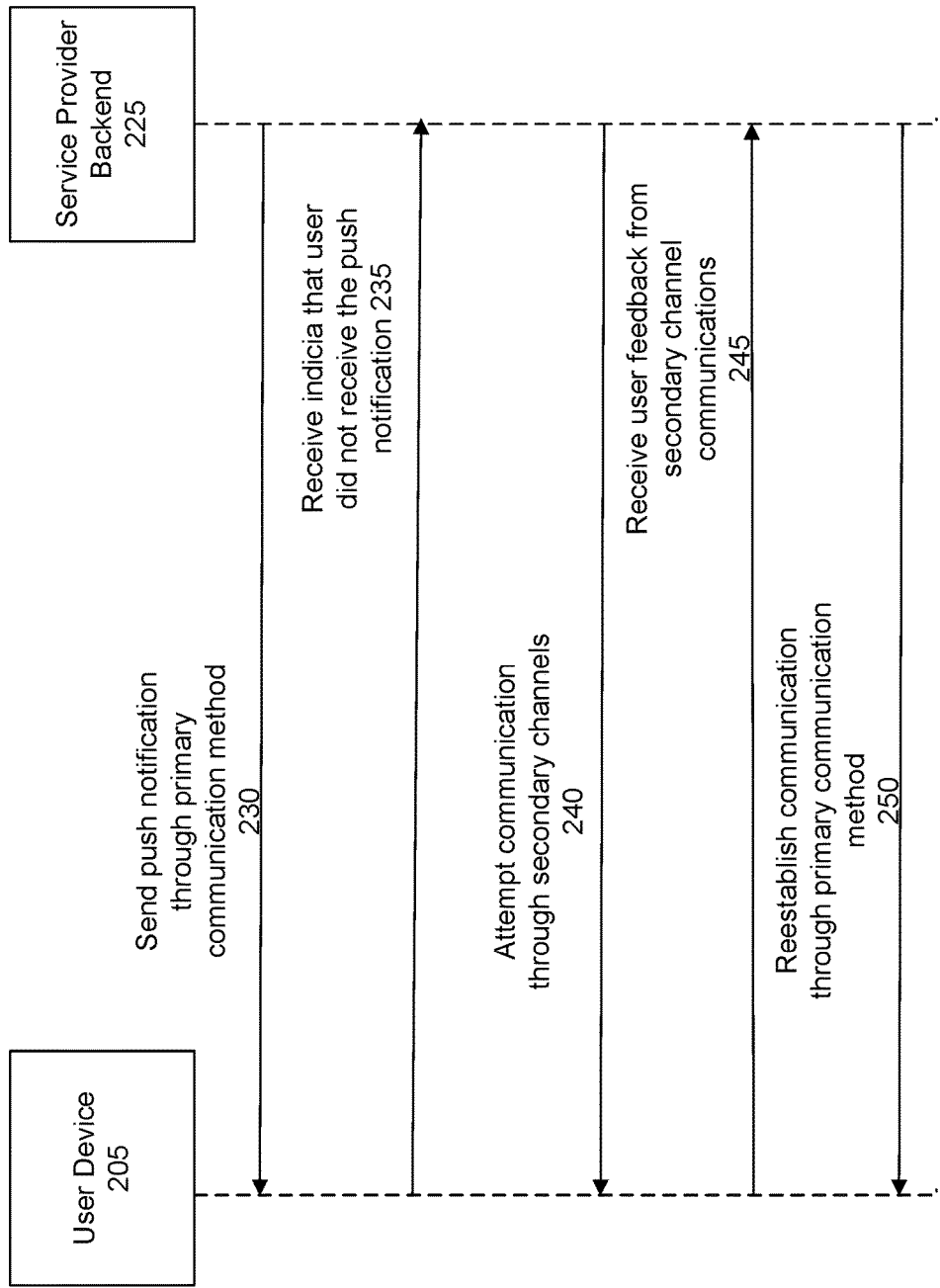
FIG. 2 illustrates a sequence of operations for detecting and repairing loss of a primary digital communication channel according to an exemplary embodiment.

The sequence diagram of FIG. 2 illustrates an exemplary application of embodiments of the invention in conjunction with the system 100 of FIG. 1. In the scenario set forth in FIG. 2, a user device 205 is in communication with a service provider backend 225. User device 205 may be a personal computer, smart phone, or any other network enabled computing device. User device 205 may also be any wearable such as a smart watch, smart glasses, etc. and may include augmented reality and/or virtual reality. User device 205 may include memory, a network communication, an interactive user interface, and a processor capable of running one or more software applications. Service provider backend 225 may include a database capable of storing historical user interaction and/or response data as well as rules defining if and when a preferred communication with a user might be broken. Service provider backend 225 may also include a processor capable of applying the stored rules to one or more of historical user interaction data and indicia that a user may not be receiving communications from the service provider backend 225.

In the sequence of FIG. 2, a user may have a service provider application installed on user device 205. A service provider for the application and service provider backend 225 may prefer to communicate with the user through the service provider application, as opposed to email, text, fax, phone call, etc. Communication through the service provider application may constitute a message that is stored in an application inbox or in any other location within the application that is navigable by the user. The application may provide notification of a new and/or unread message to the user upon entering the application. The notification may comprise a visual cue alerting the user to the existence of one or more new/unread messages, such as a number, corresponding to the number of new or unread messages, within a colored shape (e.g., a red circle) that overlays the normal application layout. The visual cue may also direct the user to where, within the application, the user may navigate in order to access the new or unread messages. The preferred communication method may also include displaying messages as "push notifications" on the user device 205. In this way, the user has immediate notification of a potentially important message without having to wait for a user to access the service provider application before becoming aware that a message was sent from the service provider.

At step 230, a message may be sent from service provider backend 225 to user device 205 in the preferred communication method. As noted, this may be a communication to a service provider application residing on user device 205 and may further include a push notification. The push notification may be displayed on user device 205, outside of the service provider application. The push notification may also trigger an alert on the phone, either an auditory alert or a vibration, depending on user settings within the phone. The push notification may function similarly to a text message in that the notification may appear on user device 205 and trigger the alert even if the screen is turned off. The push notification may also differ from traditional text messages in the size, shape, and/or color of the displayed dialogue box on user device 205. It may also differ in that the audible or vibrational alert may be customized to specifically be distinguishable from a standard text message.

After sending the communication to user device 205, service provider backend 225 may expect an acknowledgement of receipt, or some other action based on the content of the communication. For example, if the service provider is a financial entity, then the communication could range from low priority to high priority. A low priority communication may include an offer for a product or service, general information, news, etc. A high priority communication could relate to suspected fraud, transaction confirmation, etc. There could be communications that fall in between low and high priority. For example, a communication about a payment due date may be of intermediate priority. In the event of a high priority communication, service provider backend 225 may expect to receive some sort of response or feedback comprising push notification status data. In the event of a low priority communication, service provider backend 225 may not expect a response or feedback but may be able to monitor whether the user has interacted with the message, either the push notification or within the service provider application. At step 235, service provider backend 225 may receive push notification status data comprising indicia that the user did not receive the communication. This indicium may include a lack of interaction with the push notification (e.g., opening, dismissing, etc.). The indica may also include a lack of interaction with the communication within the service provider application, or with the service provider application generally. The indicia may not only indicate that a user failed to interact with the communication, but it may also be indicative of a failed communication delivery. For instance, the service provider application may be capable of registering that a push notification or communication reached the user device, regardless of whether the user interacted with the push notification/communication. In the event that the service provider application did not register receipt of the push notification/communication, then there would be indicia that the communication attempt was unsuccessful, even without user interaction data. Any lack of confirmation of receipt may constitute an indica that the communication was not received by the user.

Service provider backend 225 may have a set of rules helping to define when a preferred communication channel might be broken. For example, it may be a rule that if a high priority communication, such as a fraud notice, is not acknowledged and/or the user does not actively respond, then the communication channel is assumed to be non-functional. In another embodiment, the rules may require lack of response to a high priority communication some number of times before ruling a communication channel broken. The rules may also dictate what communication are considered high priority, as opposed to low, intermediate, or any other number of gradations of communications. The rules may also determine when a communication channel is considered broken based on lower priority communications. For instance, it may be a rule that for low priority communications, there must be multiple such communications without any user interaction before a communication channel is considered broken. The rule may also impose time-based factors on the determination such as lack of interaction with some number of low priority communications over a defined time period which could be weeks, months, etc. The rules also may be designed to determine when there is a systemic delivery failure instead of the user potentially ignoring the communication. If the service provider application does not return an acknowledgement of the communication, then the communication channel may be presumed to be non-functional. However, there are numerous potential causes for a lack of acknowledgement. For instance, the user device may be off, the service provider application may not be running in the background, the user device may be in an area lacking wifi or cell signal, etc. These issues may be temporary, so the rules may account for these possible scenarios and impose timeframes for anticipated acknowledgement of a communication. In addition to passively waiting for an acknowledgement, service provider backend may be structured to poll the user device for receipt feedback. This polling may be on a regular or irregular basis and may be determined based on the perceived importance of the notification. A lack of response to polling requests may be interpreted as a broken communication channel, and the rules may dictate how many missed responses result in a conclusion of a broken communication channel. These rules are merely exemplary and not intended to be limiting.

Service provider backend 225 may apply the set of rules to the indica received from monitoring user device 205 at step 235, subsequent to sending the communication at step 230. In one example, the communication sent at step 230 is a transaction verification notification and the user of user device 205 does not interact, acknowledge, or respond to the push notification. The rule set includes a rule requiring that transaction verification notifications must be responded to within 10 minutes. After 10 minutes has elapsed without user response, service provider backend 225 would determine that the communication channel with user device 205 is broken.

Indicia that a user may not have received the communication may not be limited to instances where a user does not acknowledge, interact with, or respond to a communication. Other indicia may include a failed delivery notification or changes in expected responses. For instance, if a user has a routine type of response to a given communication, but then responds differently to this type of communication, that different response might be an indicia. Furthermore, indicia that a user may not have received the communication may also include indications of fraud. For example, service provider backend 225 may receive login attempts for a user from an unrecognized device, a device associated with a different user, etc. Service provider backend 225 may include rules for suspicious and/or fraudulent indicia as well.

Once service provider backend 225 has determined that the preferred communication channel is broken with respect to user device 205, service provider backend 225 may attempt active communication with the user through secondary channels at step 240. The reason for a broken communication channel may include the user has acquired a different phone, changed SIM cards (e.g., changed phone number), lost login credentials and has been locked out of the service provider application, has deleted the service provider application (presumably inadvertently), or any other circumstance that might lead to a breakdown in a preferred communication channel. The potential reasons for the broken communication channel may inform the attempted communication through secondary channels at step 240. These secondary channels may include email, text message (SMS), phone call, etc. Secondary channels may also include attempting to communicate through augmented reality and/or virtual reality on various related equipment such as smart glasses, virtual reality goggles, etc. Communication attempts through augmented reality may include pop-up messages, or an augmentation provided when various things are viewed through smart glasses. For instance, a user wearing smart glasses may look at an advertisement, store front, or any signage related to a financial institution and that may trigger an overlay with a notification that a primary communication channel may be inoperative. The same sort of scenario may exist within a virtual reality space or metaverse whereby notifications may be provided within those spaces and those notifications may be triggered by interactions with various elements within those spaces. Communication attempts through secondary channels may also include transmission of the communication to a secondary user device where that user device may be any other device connected to the Internet. These secondary devices may be considered Internet of things ("IOT") devices.

In one embodiment, if service provider backend 225 believes the root cause of the broken communication channel is due to deletion of the service provider application, then the service provider backend 225 may select the secondary communication to be sent via email, text message, etc. In another embodiment where the service provider backend 225 believes that the user might have changed his or her phone number, then a text message may not be sent, but an email to an email account presumably received by a second user device. Service provider backend 225 may attempt all secondary communication channels or some portion thereof, depending on circumstances and/or rules.

The communication attempt may be a copy of the communication attempted at step 230, but the communication attempt may also be different. The communication attempt may not focus on the purpose of the communication at step 230, instead, the communication attempt at step 240 may be focused on reestablishing a confirmed communication channel with the user. For example, the communication at step 240 may include a query as to whether the user device is active. In another embodiment, the communication at step 240 may include an email to the user with an explanation of the broken preferred communication channel and a request to repair that preferred communication channel. The email may include one or more links acting as shortcuts to reestablish the preferred communication channel. A link may be to the service provider website, it may be to a web page with instructions for reestablishing the primary communication channel. Links sent in communication attempts at step 240 may include some level of pre-authorization depending on a confidence factor associated with the communication. For instance, a link provided in a communication attempt may pre-authorize the user so that when the link is clicked, the user is granted immediate access to his or her accounts. In some embodiments where there is suspicion that a user's phone number may be compromised, then this type of link would not be sent via text message but might be sent to an email address. The opposite is true in circumstances where there is concern that an email address may be outdated or compromised. Just as the attempted secondary communication channel(s) may be informed by the perceived cause of the broken primary communication channel, so too might the content of the communication be informed by the perceived cause of the broken communication channel. For instance, if service provider backend 225 suspects that the user may have deleted the service provider application from user device 205, then the communication may include instructions to download the app or even a link that may initiate app download. The same approach may be applied to an expiring token included in the communication attempted through the secondary communication channel. The expiring token may allow the user to log into the application on a second user device while obviating the need for the user to provide authenticating credentials when a perceived confidence interval exceeds a threshold value.

At step 245, service provider backend 225 receives user feedback from the secondary communication attempt. This feedback may include some form of assent or assurance that the preferred communication method is functioning and/or reliable. For example, the feedback may be an acknowledgement of receipt of the communication sent at step 230. The feedback may also include confirmation of re-downloading the service provider application or updating account information to include a new phone number, email, or other contact information. The feedback may allow the service provider backend 225 to determine a type of secondary user device. The reply may further allow service provider backend 225 to determine a status of the application on the secondary user device. The service provider backend 225 may be able to analyze the feedback from the secondary communication attempt to a secondary user device to determine if there is potential fraudulent activity and then report that to a financial institution associated with the user. Service provider backend 225 may alter a default communication channel based on a reply or feedback received from the secondary communication attempt through the alternative communication channel. For instance, if the service provider backend 225 determines there is a possibility of fraudulent activity, it may adjust communication channels. Also, if the service provider backend 225 determines that the user has obtained a new primary device and that the reply/feedback originated from that new device, then service provider backend 225 may make adjustments as appropriate.

Once service provider backend 225 is confident that the preferred communication channel is functioning, then at step 250, service provider backend 225 begins re-sending communications to user device 205 through the preferred communication channel.

In some embodiments, it may be desirable to employ machine learning to determine if and when a preferred communication channel with a user is broken. It may also be desirable to add passive communication attempts through secondary communication channels. The sequence diagram of FIG. 3 illustrates an exemplary scenario in which the backend utilizes a machine learning algorithm as well as other structure for attempting secondary communication with a user.

Figure 3:
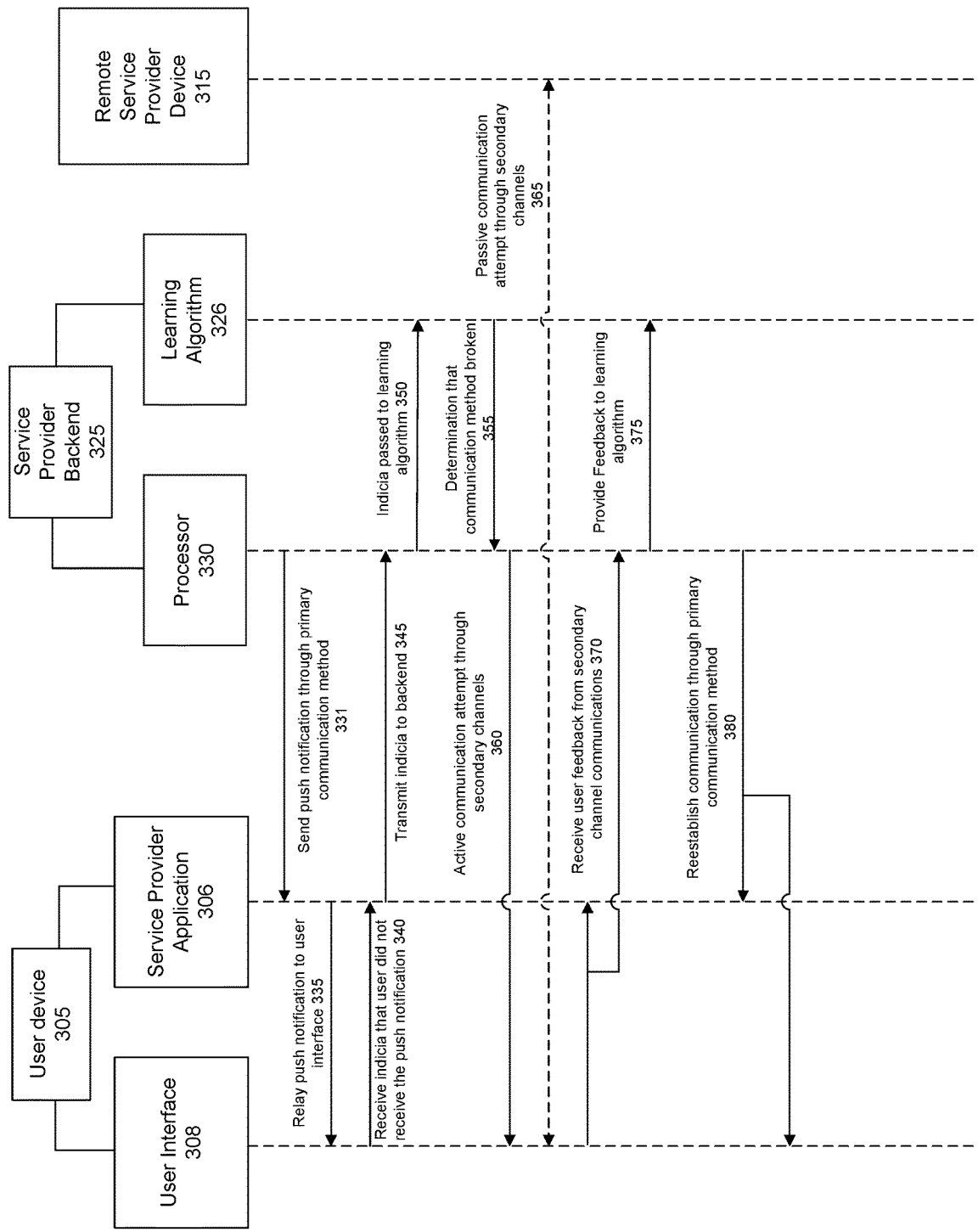
FIG. 3 illustrates a sequence of operations for detecting and repairing loss of a primary digital communication channel according to an exemplary embodiment.

The sequence diagram of FIG. 3 illustrates an exemplary application of embodiments of the invention in conjunction with the system 100 of FIG. 1. In the scenario set forth in FIG. 3, a user device 305 may include user interface 308 as well as a service provider application 306. The user device 305 is in communication with a service provider backend 325. User device 305 may be a personal computer, smart phone, smart watch, or any other network enabled computing device. User device 305 may include memory, a network communication, an interactive user interface, and a processor capable of running one or more software applications. Service provider backend 325 may include a processor 330 and a learning algorithm 326 capable of making determinations as to if and when a preferred communication with a user might be broken. Remote service provider device 315 may be coupled to service provider backend 325 via a network connection and may provide services related to a service provider. For example, in a case where the service provider is a financial institution, remote service provider device 315 may be an automated teller machine ("ATM").

In the sequence of FIG. 3, a user may have service provider application 306 installed on user device 305. A service provider for the application and service provider backend 325 may prefer to communicate with the user through the service provider application, as opposed to email, text, fax, phone call, etc. Communication through the service provider application may constitute a message that is stored in an application inbox or in any other location within the application that is navigable by the user. The application may provide notification of a new and/or unread message to the user upon entering the application. The notification may comprise a visual cue alerting the user to the existence of one or more new/unread messages, such as a number, corresponding to the number of new or unread messages, within a colored shape (e.g., a red circle) that overlays the normal application layout. The visual cue may also direct the user to where, within the application, the user may navigate in order to access the new or unread messages. The preferred communication method may also include displaying messages as "push notifications" on the user interface 308. In this way, the user has immediate notification of a potentially important message without having to wait for a user to access the service provider application before becoming aware that a message was sent from the service provider.

At step 331, a message may be sent from service provider backend 325 to the service provider application 306 in the preferred communication method. For example, as a message within the service provider application 306. At step 335, the service provider application 306 may relay that message to the user interface 308 as a push notification. The push notification may be displayed on user interface 308, outside of the service provider application and may also trigger an alert on the phone, either an auditory alert or a vibration, depending on user settings within the phone. The push notification may function similar to a text message in that the notification may appear on user interface 308 and trigger an alert even if the user interface 308 is off at the time the push notification is sent. The push notification may also differ from traditional text messages in the size, shape, and/or color of the displayed dialogue box on user interface 308. It may also differ in that the audible or vibrational alert may be customized to specifically be distinguishable from a standard text message.

After relaying the push notification to user interface 308 at step 335, service provider backend 325 may expect an acknowledgement of receipt, or some other action based on the content of the communication. For example, if the service provider is a financial entity, then the communication could range from low priority to high priority. A low priority communication may include an offer for a product or service, general information, news, etc. A high priority communication could relate to suspected fraud, transaction confirmation, etc. There could be communications that fall in between low and high priority. For example, a communication about a payment due date may be of intermediate priority. In the event of a high priority communication, service provider backend 325 may expect to receive some sort of response or feedback. In the event of a low priority communication, service provider backend 325 may not expect a response or feedback but may be able to monitor whether the user has interacted with the message, either the push notification or within the service provider application. At step 340, the service provider application 306 may collect indicia that the user did not receive the push notification. At step 345, service provider application 306 may relay that indica to service provider backend 325. These indicia may include a failure to interact with the push notification (e.g., opening, dismissing, etc.). Other indicia may be collected through the service provider application 306. For example, a user might interact with the service provider application 306, but not access the message sent from service provider backend 325. In another embodiment, service provider backend 325 may have no visibility to whether service provider application 306 is still on user device 305. In that scenario, step 331 may occur, but then not be received by service provider application 306. In this example, the indicia that the user did not receive the push notification would simply be a lack of any sort of response or feedback to service provider backend 325. Any lack of confirmation of receipt may constitute an indica that the communication was not received by the User.

Service provider backend 325 may employ a learning algorithm 326 implemented by the processor 330 associated with service provider backend 325 to predict when a preferred communication channel might be broken. Service provider backend 325 may store historical user interaction habits in a database connected to learning algorithm 326. The historical user interaction habits may help learning algorithm 326 to predict when a preferred communication channel might be broken. For example, if a user always responds to a certain type of push notification, then a lack of response may be interpreted by the learning algorithm 326 as a result of a broken communication channel. The historical user interaction data may also include historical systemic issues. For example, the historical user interaction data may evidence that a user routinely travels in areas where there is no cell signal, so the user device is more likely to not confirm receipt of a communication or respond to active polling from a service provider backend, at least without some amount of delay. The same is true of other potentially systemic issues. For example, the user may routinely turn off the user device at certain times of the day, etc. The analysis may be more complex. For example, the learning algorithm 326 may consider the importance of the push notification, how much data is contained in the user's historical actions (e.g., how many datapoints), etc. The learning algorithm may weight each factor and make predictions based on a complex analysis of all factors and feedback from previous predictions. In some embodiments, the learning algorithm 326 may consider instances where there is no confirmation of a user receiving a push notification, where there is a suspicious confirmation, where logins associated with the user's service provider application account originate from a device not associated with the user or a different phone number, etc. As noted, the learning algorithm 326 may weigh different types of push notifications differently. For example, fraud notifications may be considered more important than advertising or simple informational notifications, and may be weighed more heavily. Other types of notifications, such as billing info and the like, may be considered and weighed based on perceived importance by the learning algorithm 326. Learning algorithm 326 may be capable of providing accurate predictions based on incomplete and/or uncertain information. For example, a push notification may be sent regarding an upcoming bill payment due date. Historical user interaction history may indicate that about 25% of the time, a given user specifically acknowledges these billing notifications, and 50% of the time, the user pays the bill within 24 hours of receiving the notification. In an instance where a billing notification is sent and service provider backend 325 receives indicia indicating that there was no interaction with the push notification and no bill payment 36 hours after the notification, the learning algorithm 326 must determine if the communication channel is broken. The learning algorithm 326 must predict if the user did not receive the notification, or if the user did not interact with the notification and did not pay the bill for any number of other potential reasons. In making a prediction, the learning algorithm may consider any and all data available. For instance, learning algorithm 326 may consider what the 25% notification acknowledgement rate looks like over time. Was the rate 100% a year ago dropping to 0% more recently and the average over the time period is 25%? Was the rate 0% a year ago and ramping up to 100% more recently with the average over the time period equaling 25%? These two cases might be treated differently by learning algorithm 326. The same is true of any other available data, learning algorithm 326 may dive down and try to better understand what the data is likely indicating prior to making a prediction. In this way, learning algorithm 326 may establish one or more relationships between different and seemingly unrelated pieces of information, and therefore be able to create dependencies and consider factors that are not visible to humans. Learning algorithm 326 may be able to test these relationships and analyses based on these relationships through feedback on predictions over time. In some embodiments, there may be a hybrid approach where some number of baseline rules are programmed and then learning algorithm 326 operates and makes predictions on top of that baseline set of rules. The baseline set of rules may include rules when the system must, or must not, conclude that a preferred communication channel is broken.

At step 350, the indicia may be passed from the processor 330 to learning algorithm 326 for analysis. As discussed, learning algorithm 326 may predict whether a preferred communication channel with the user is broken. This prediction is provided from learning algorithm 326 to processor 330 at step 355. Upon predicting that the preferred communication channel is broken, service provider backend 325 via processor 330 may employ an active communication attempt through secondary channels at step 360.

There are many potential reasons that a preferred communication channel may become broken. For instance, the user may have acquired a different phone, changed SIM cards (e.g., changed phone number), lost login credentials or been locked out of the service provider application, deleted the service provider application (presumably inadvertently), or any other circumstance that might lead to a breakdown in a preferred communication channel. The potential reasons for the broken communication channel may inform the attempted communication through secondary channels at step 360. These secondary channels may include email, text message (SMS), phone call, etc. In one embodiment, if service provider backend 325 believes the root cause of the broken communication channel is due to deletion of the service provider application, then the secondary communication may be sent via email, text message, etc. In another embodiment where the service provider backend 325 believes that the user might have changed his or her phone number, then a text message may not be sent, but an email. Service provider backend 325 may attempt all secondary communication channels or some portion thereof, depending on circumstances and/or rules.

The active communication attempt may include the same information comprising the subject of the communication attempted at step 331, but the communication attempt may also be different. The communication attempt may not focus on the purpose of the communication at step 331, instead, the communication attempt at step 360 may be focused on reestablishing a confirmed communication channel with the user. For example, the communication at step 360 may include an email to the user with an explanation of the broken preferred communication channel and a request to repair that preferred communication channel. The email may include one or more links acting as shortcuts to reestablish the preferred communication channel. A link may be to the service provider website, it may be to a web page with instructions for reestablishing the primary communication channel. Links sent in communication attempts at step 360 may include some level of pre-authorization depending on a confidence factor associated with the communication. This confidence factor may be determined by the learning algorithm 326. For instance, a link provided in a communication attempt may pre-authorize the user so that when the link is clicked, the user is granted immediate access to his or her accounts. In some embodiments where there is suspicion that a user's phone number may be compromised, then this type of link would not be sent via text message but might be sent to an email address. The opposite is true in circumstances where there is concern that an email address may be outdated or compromised. Just as the attempted secondary communication channel(s) may be informed by the perceived cause of the broken primary communication channel, so too might the content of the communication be informed by the perceived cause of the broken communication channel. For instance, if service provider backend 325 suspects that the user may have deleted the service provider application from user device 305, then the communication may include instructions to download the app or even a link that may initiate app download. The same approach may be applied to an expiring token included in the communication attempted through the secondary communication channel. The expiring token may obviate the need for the user to provide authenticating credentials when a perceived confidence interval exceeds a threshold value.

In parallel with the active communication attempt of step 360, at step 365, a passive communication attempt may originate from any number of remote service provider devices, represented here by remote service provider device 315. Remote service provider device 315 may be an automated teller machine ("ATM"), bank branch kiosk, or any other means of reaching the user where the user's primary purpose for interacting with the device is not to reestablish communication with the service provider backend 325. In the case where remote service provider device 315 is an ATM, a user may approach the ATM for a financial transaction such as a cash withdrawal or a deposit. Upon authenticating to the ATM, the ATM may recognize, through network connection with service provider backend 325, that the preferred communication method with the user is believed to be broken. Prior to, or within the course of the user's desired financial transaction, the ATM may prompt the user to reestablish the preferred communication method. This may entail a simple confirmation of receipt of a test message from service provider backend 325, as initiated by remote service provider device 315. In the event that the user is not receiving notifications from service provider backend 325, the ATM may help troubleshoot user device 305 to understand the break in the communication channel. For example, if the user has changed SIM cards (e.g., phone numbers), then the ATM can help update user account information. If the user has purchased a new device, then the service provider backend 325 may update user device information. This may be through user entry of device ID or some form of touchless communication such as near field communication ("NFC"), Bluetooth®, etc. where the user device 305 transmits the requested user device ID to the remote service provider device 315 and ultimately to the service provider backend 325 via a network communication. In the event that the user has deleted the application, the ATM may provide instructions to re-download, or, if allowed, may even push the application to the user device 305 while the user's financial transaction is pending. Remote service provider device 315 may be capable of confirming that the preferred communication channel has been reestablished prior to the user leaving remote service provider device 315. Other remote service provider devices may have the same or similar capabilities. In some embodiments, a human teller at a bank branch may be prompted by the teller's computer to help a user reestablish a broken communication channel. In this example, the human teller's computer would be remote service provider device 315, and the human teller would simply be an intermediary between the user and the service provider backend 325.

At step 370, service provider application 306 and service provider backend 325 may receive user feedback from the secondary communication attempt (both active and passive). This feedback may include some form of assent or assurance that the preferred communication method is functioning and/or reliable. For example, the feedback may be an acknowledgement of receipt of the active communication sent at step 360 or the passive communication at step 365. The feedback may also include confirmation of re-downloading the service provider application, or updating account information to include a new phone number, email, or other contact information.

At step 375, the feedback is provided to learning algorithm 326 to train, further refine, and improve the learning algorithm 326. The user feedback data may help train the machine learning algorithm in a variety of different ways. For example, if the user feedback is an affirmation that the prior communication at step 331 was received and simply ignored, then the learning algorithm 326 will be able to refine the predictions and change/optimize weighting and relationships that led to the incorrect prediction. The same may be true for feedback indicating that learning algorithm 326 correctly predicted that the communication channel was broken. The feedback may help refine future predictions because the cause of the broken communication channel may have been predicted incorrectly, so it is possible that learning algorithm 326 got the correct result for the wrong reasons. In that case, the feedback is useful to train the learning algorithm. In the event that the algorithm predicted correctly, and the prediction was based on a correct analysis, the learning algorithm 326 may use the feedback to further reinforce the analysis. This may include changing weighting for factors that more strongly favor the correct analysis, etc. The foregoing are examples of how the user feedback data may be used by the learning algorithm 326 and are not meant to be exhaustive.

With continued feedback and training of the learning algorithm 326 over time, the learning algorithm 326 may not only become more accurate, but also more efficient. This is because less computing resources are required as the machine learning algorithm becomes more confident in its predictions. Thus, not only is the accuracy of the predictions improved over time, but the functioning of the computer is also improved over time as the learning algorithm 326 is trained.

Once service provider backend 325 is confident that the preferred communication channel is functioning, then at step 380, service provider backend 325 may begin re-sending communications to user device 305 through the preferred communication channel.

Figure 4:
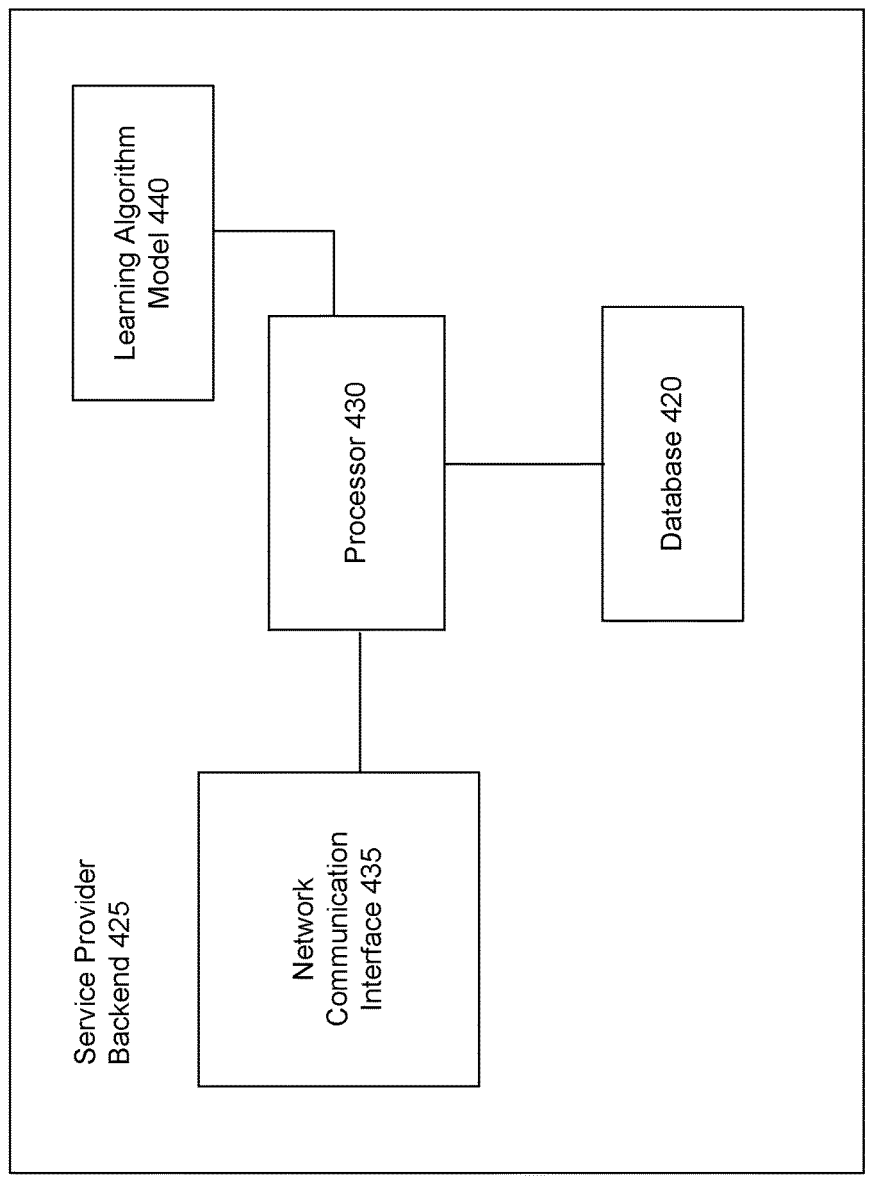
FIG. 4 is a schematic representation of an application backend according to an exemplary embodiment.

With reference to FIG. 4, service provider backend 425 may be a server such as a dedicated server computer, such as bladed servers, or personal computer, laptop computer, notebook computer, palm top computer, network computer, or any processor-controlled device capable of supporting the system 100. While FIG. 4 illustrates a service provider backend 425 that may be a single server, it is understood that other embodiments can use multiple servers or multiple computer systems as necessary or desired to support the users and can also use back-up or redundant servers to prevent network downtime in the event of a failure of a particular server. In a particular embodiment illustrated in FIG. 4, service provider backend 425 includes a processor 430 in communication with a database 420, a network communication interface 435, and a learning algorithm module 440. The processor 430 may include a microprocessor and associated processing circuitry, and can contain additional components, including processors, memories, error and parity/CRC checkers, data encoders, anticollision algorithms, controllers, command decoders, security primitives and tamper-proofing hardware, as necessary to perform the functions described herein. The database 420 may comprise memory and can be a read-only memory, write-once read-multiple memory or read/write memory, e.g., RAM, ROM and EEPROM, and the user device can include one or more of these memories.

The network communication interface 435 is configured to establish and support wired and/or wireless data communication capability for connecting the service provider backend 425 to the network 110 or other communication network. The network communication interface 435 can also be configured to support communication with a short-range wireless communication interface, such as Bluetooth.

In embodiments of the invention, the processor 430 may generate a notification for a user. The notification may be sent via network communication interface 435 to a user device, or to an application on a user device. Service provider backend 425 may then expect an acknowledgement of receipt, or some other action based on the content of the communication. For example, if the service provider is a financial entity, then the communication could range from low priority to high priority. A low priority communication may include an offer for a product or service, general information, news, etc. A high priority communication could relate to suspected fraud, transaction confirmation, etc. There could be communications that fall in between low and high priority. For example, a communication about a payment due date may be of intermediate priority. In the event of a high priority communication, service provider backend 425 may expect to receive some sort of response or feedback. In the event of a low priority communication, service provider backend 425 may not expect a response or feedback but may be able to monitor whether the user has interacted with the message. This may be accomplished through an application on the user's device.

Service provider backend 425 may receive, via network communication interface 435, some form of indicia that the notification was not received. These indicia may include a lack of interaction with the push notification (e.g., opening, dismissing, etc.). The indica may also include a lack of interaction with the communication within the application, or with the application generally. Any lack of confirmation of receipt may constitute an indica that the communication was not received by the user. Service provider backend 425 may store this indicia in database 420. It may also forward this indica to learning algorithm module 440.

Learning algorithm module 440 may take the indicia received in response to the notification sent to the user as well as historical user data from database 420 as inputs. Learning algorithm module 440 may use these inputs to predict whether the preferred communication channel used by service provider backend 425 when sending the user notification is broken.

Upon a prediction by learning algorithm module 440 that the preferred communication channel is broken, service provider backend 425 may send, via network communication interface 435, one or more communications to the user through different communication channels. These different communication channels may include email, text message (SMS), phone call, etc. In one embodiment, if service provider backend 425 believes the root cause of the broken communication channel is due to deletion of the service provider application, then the secondary communication may be sent via email, text message, etc. In another embodiment where the service provider backend 425 believes that the user might have changed his or her phone number, then an email may be sent instead of a text message. Service provider backend 425 may attempt all secondary communication channels or some portion thereof, depending on circumstances and/or rules.

Service provider backend 425 may compose the secondary communication as a copy of the initial user notification, but the communication attempt may also be different. The communication attempt may not focus on the purpose of the initial user notification but instead, the secondary communication attempt may be focused on reestablishing a confirmed communication channel with the user. For example, service provider backend 425 may send an email to the user with an explanation of the broken preferred communication channel and a request to repair that preferred communication channel. The email may include one or more links acting as shortcuts to reestablish the preferred communication channel. A link may be to the service provider website, it may be to a web page with instructions for reestablishing the primary communication channel. These links may include some level of pre-authorization depending on a confidence factor associated with the communication. For instance, a link provided in a communication attempt may pre-authorize the user so that when the link is clicked, the user is granted immediate access to his or her accounts. In some embodiments where there is suspicion that a user's phone number may be compromised, then this type of link would not be sent via text message but might be sent to an email address. The opposite is true in circumstances where there is concern that an email address may be outdated or compromised. Just as the attempted secondary communication channel(s) may be informed by the perceived cause of the broken primary communication channel, so too might the content of the communication be informed by the perceived cause of the broken communication channel. For instance, if service provider backend 425 suspects that the user may have deleted the application from the user device, then the communication may include instructions to download the app or even a link that may initiate app download.

The service provider backend 425 may receive feedback, via network communication interface 435, on the secondary communication attempt(s). This feedback may be shared with learning algorithm module 440 in order to train and improve learning algorithm module 440. This feedback may include some form of assent or assurance that the preferred communication method is functioning and/or reliable. For example, the feedback may be an acknowledgement of receipt of the initial user notification. The feedback may also include confirmation of re-downloading the application or updating account information to include a new phone number, email, or other contact information. Based on this feedback, service provider backend 425 may begin re-sending notifications to the user through the preferred communication channel.

Figure 5:
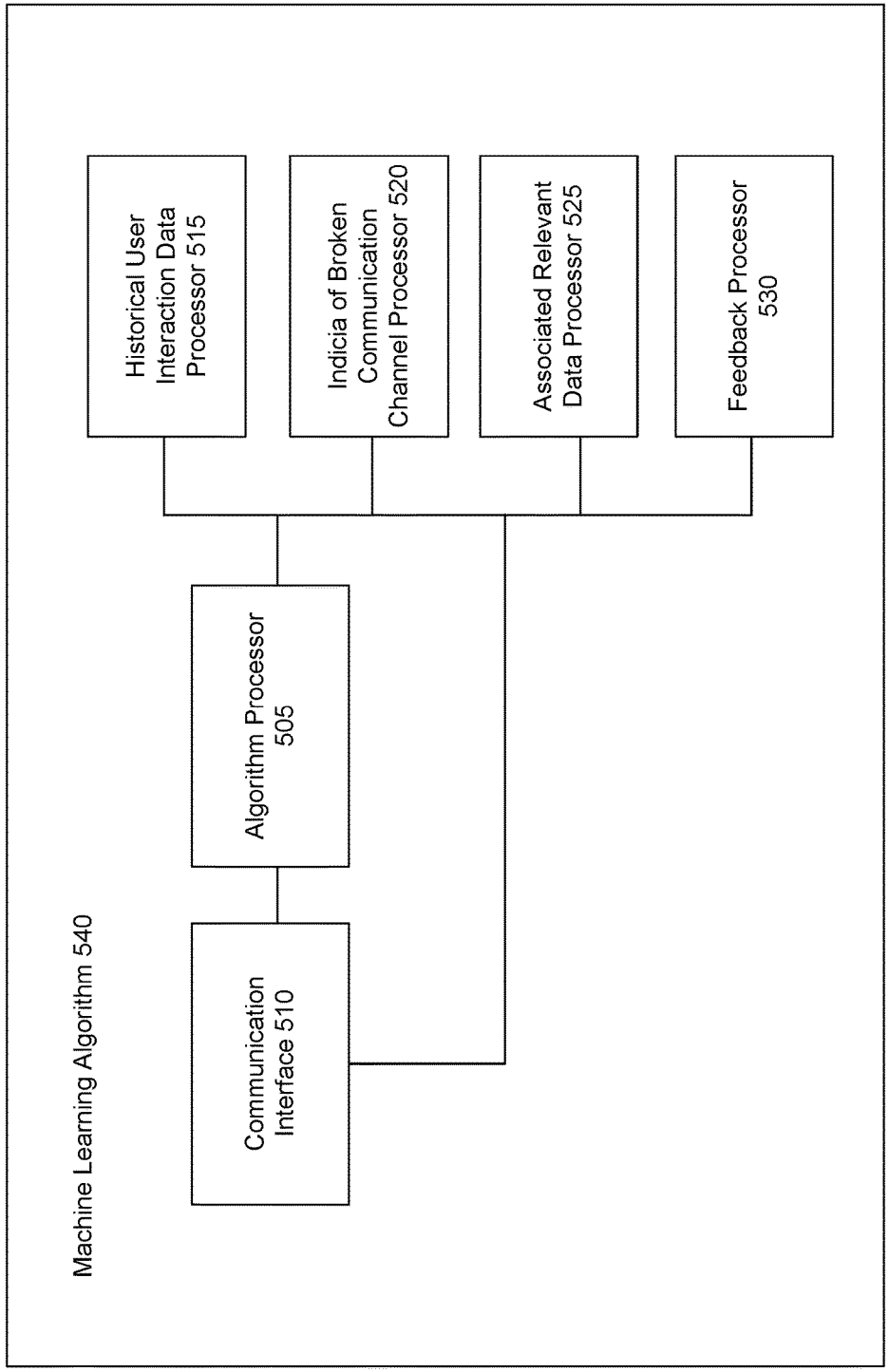
FIG. 5 is a schematic representation of a machine learning algorithm module within the application backend according to an exemplary embodiment.

With reference to FIG. 5, machine learning algorithm 540 may be part of an application backend and may predict when a primary communication channel may be inoperative or broken. Machine learning algorithm 540 may include a communication interface 510 as well as an algorithm processor 505 coupled to a plurality of additional processors including historical user interaction data processor 515, indicia of broken communication channel processor 520, associated relevant data processor 525, and feedback processor 530. The processors of FIG. 5 may include microprocessors and associated processing circuitry, and can contain additional components, including processors, memories, error and parity/CRC checkers, data encoders, anticollision algorithms, controllers, command decoders, security primitives and tamper-proofing hardware, as necessary to perform the functions described herein. It should be appreciated that while FIG. 5 depicts multiple discrete processors, the machine learning algorithm may be accomplished by any number of processors including a single processor.

Machine learning algorithm 540 may receive a number of inputs from the service provider backend through communication interface 510. These inputs may include indicia that one or more notifications from the service provider backend to a user device were not received by the user. The indicia may include a lack of interaction with the push notification (e.g., opening, dismissing, etc.). The indica may also include a lack of interaction with the communication within the application, or with the application generally. Any lack of confirmation of receipt may constitute an indica that the communication was not received by the user. The inputs may also include historical user interaction data. The historical user interaction data may encompass a user's prior interactions, or lack thereof, with various types of notifications. This data may be input into machine learning algorithm 540 as raw data, or formatted in various ways, such as interactions over some time period, interactions by notification type, percentage likelihood of interaction over time, trends over time, etc. The inputs may further include any other relevant data potentially stored in a database maintained by the service provider backend. Finally, machine learning algorithm 540 may receive feedback as a discrete type of input. The feedback may include feedback from a user relating to one or more attempts to reach the user through secondary communication channels. The accuracy of a machine learning algorithm 540 prediction may be inferred from the feedback.

The indicia received by the service provider backend in response to a notification sent to a user device may be utilized by indicia of broken communication channel processor 520 to help predict whether a preferred communication channel is possibly broken. For instance, the indicia data may go into indicia of broken communication channel processor 520 and be analyzed for context and relational data. This relational data may allow the machine learning algorithm 540 to more fully whether a communication channel is likely broken. The indicia may include a user's lack of any response to a billing notification. Indicia of broken communication channel processor 520 may determine that the lack of response is over a relatively short time frame (e.g., ~1 hour) and therefore consider the indicia within the context of the timing. Other context and relational data may be considered. Indicia of broken communication channel processor 520 may leverage the context and relational data to favor or disfavor certain criteria in determining the likelihood that a communication channel is broken. This may be accomplished through assigning weights to different indicia. Based on the indicia and context, indicia of broken communication channel processor 520 may determine a likelihood that a preferred communication channel is broken.

Historical user interaction data processor 515 may further refine the likelihood that a preferred communication channel is broken. This may be accomplished by providing greater context to the indica input. For example, if a user historically always responds to a certain type of notification, then a lack of response may be interpreted by the historical user interaction data processor 515 as a result of a broken communication channel. The analysis may be more complex. For example, the historical user interaction data processor 515 may consider other factors influencing the historical data such as the size of the historical data set (e.g., the number of datapoints), etc. The historical user interaction data processor 515 may weigh each factor based on context derived from the available historical data. In some embodiments, the historical user interaction data processor 515 may consider instances where there is no confirmation of a user receiving a push notification, where there is a suspicious confirmation, where logins associated with the user's service provider application account originate from a device not associated with the user or a different phone number, etc. Historical user interaction data processor 515 may help the machine learning algorithm 540 be capable of providing accurate predictions based on incomplete and/or uncertain information. For example, a push notification may be sent regarding an upcoming bill payment due date. Historical user interaction history may indicate that about 25% of the time, a given user specifically acknowledges these billing notifications, and 50% of the time, the user pays the bill within 24 hours of receiving the notification. In an instance where a billing notification is sent and the service provider backend receives indicia indicating that there was no interaction with the push notification and no bill payment 36 hours after the notification, the machine learning algorithm 540 must determine if the communication channel is broken. Machine learning algorithm 540 must predict if the user did not receive the notification, or if the user did not interact with the notification and did not pay the bill for any number of other potential reasons. In making a prediction, the historical user interaction data processor 515 may consider any and all historical data available. For instance, historical user interaction data processor 515 may consider what the 25% notification acknowledgement rate looks like over time. Was the rate 100% a year ago dropping to 0% more recently and the average over the time period is 25%? Was the rate 0% a year ago and ramping up to 100% more recently with the average over the time period equaling 25%? These two cases might be treated very differently by historical user interaction data processor 515.

Associated relevant data processor 525 may further enhance the overall analysis by providing additional historical data that is not tied exclusively to the user but may represent a larger pool of users. Associated relevant data processor 525 may be able to determine additional relationships between the indicia, the historical user data, and one or more piece or set of data from a larger set of pooled user data. Associated relevant data processor 525 may attempt to get an overall idea based on more globalized data, what the indica is likely indicating prior to making a prediction. In this way, machine learning algorithm 540 may establish one or more relationships between different and seemingly unrelated pieces of information, and therefore be able to create dependencies and consider factors that are not visible to humans. Machine learning algorithm 540 may be able to test these relationships and analyses based on these relationships through feedback on predictions over time. Feedback processor 530 helps test these relationships and analyses over time through feedback. For example, if the user feedback is an affirmation that the initial notification from the service provider backend was received and simply ignored, then the feedback processor 530 may refine future predictions and change/optimize weighting and relationships that led to the incorrect prediction. The same may be true for feedback indicating that machine learning algorithm 540 correctly predicted that the communication channel was broken. Feedback processor 530 may help refine future predictions by further analyzing the correct prediction feedback. It may be the case that the prediction was correct but based on faulty reasoning/logic. In that case, the feedback is useful to train the learning algorithm by changing assumptions, weighting, revisiting perceived relationships, etc. In the event that the algorithm predicted correctly, and the prediction was based on a correct analysis, the feedback processor 530 may use the feedback to further reinforce the correct analysis. This may include changing weighting for factors that more strongly favor the correct analysis, etc.

The predictive models described herein may utilize various neural networks, such as convolutional neural networks ("CNNs") or recurrent neural networks ("RNNs"), to generate the exemplary models. A CNN may include one or more convolutional layers (e.g., often with a subsampling step) and then followed by one or more fully connected layers as in a standard multilayer neural network. CNNs may utilize local connections, and may have tied weights followed by some form of pooling which may result in translation invariant features.

A RNN is a class of artificial neural network where connections between nodes form a directed graph along a sequence. This facilitates the determination of temporal dynamic behavior for a time sequence. Unlike feedforward neural networks, RNNs may use their internal state (e.g., memory) to process sequences of inputs. A RNN may generally refer to two broad classes of networks with a similar general structure, where one is finite impulse and the other is infinite impulse. Both classes of networks exhibit temporal dynamic behavior. A finite impulse recurrent network may be, or may include, a directed acyclic graph that may be unrolled and replaced with a strictly feedforward neural network, while an infinite impulse recurrent network may be, or may include, a directed cyclic graph that may not be unrolled. Both finite impulse and infinite impulse recurrent networks may have additional stored state, and the storage may be under the direct control of the neural network. The storage may also be replaced by another network or graph, which may incorporate time delays or may have feedback loops. Such controlled states may be referred to as gated state or gated memory, and may be part of long short-term memory networks ("LSTMs") and gated recurrent units RNNs may be similar to a network of neuron-like nodes organized into successive "layers," each node in a given layer being connected with a directed e.g., (one-way) connection to every other node in the next successive layer. Each node (e.g., neuron) may have a time-varying real-valued activation. Each connection (e.g., synapse) may have a modifiable real-valued weight. Nodes may either be (i) input nodes (e.g., receiving data from outside the network), (ii) output nodes (e.g., yielding results), or (iii) hidden nodes (e.g., that may modify the data en route from input to output). RNNs may accept an input vector x and give an output vector y. However, the output vectors are based not only by the input just provided in, but also on the entire history of inputs that have been provided in in the past.

For supervised learning in discrete time settings, sequences of real-valued input vectors may arrive at the input nodes, one vector at a time. At any given time step, each non-input unit may compute its current activation (e.g., result) as a nonlinear function of the weighted sum of the activations of all units that connect to it. Supervisor-given target activations may be supplied for some output units at certain time steps. For example, if the input sequence is a speech signal corresponding to a spoken digit, the final target output at the end of the sequence may be a label classifying the digit. In reinforcement learning settings, no teacher provides target signals. Instead, a fitness function, or reward function, may be used to evaluate the RNNs performance, which may influence its input stream through output units connected to actuators that may affect the environment. Each sequence may produce an error as the sum of the deviations of all target signals from the corresponding activations computed by the network. For a training set of numerous sequences, the total error may be the sum of the errors of all individual sequences.

Figure 6:
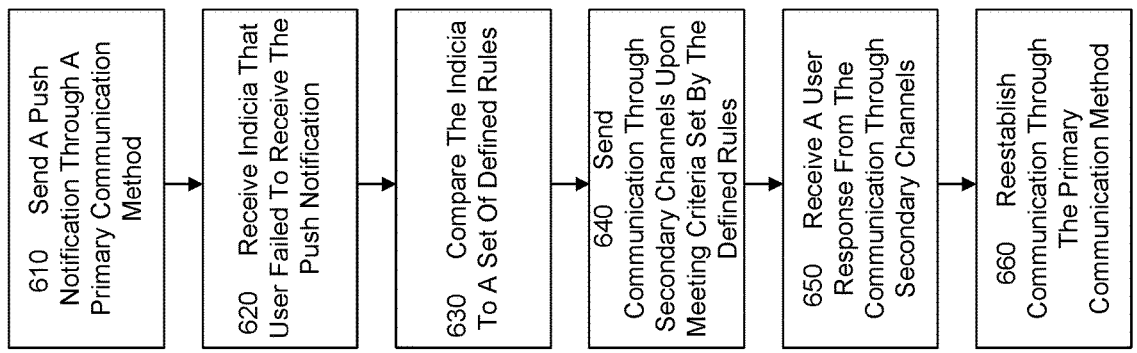
FIG. 6 is a flow diagram illustrating a method of detecting and repairing loss of a primary digital communication channel according to an embodiment of the invention.

FIG. 6 illustrates an exemplary method for detecting and repairing the loss of a primary digital communication channel with a customer according to an embodiment of the invention. The actions of the method depicted in FIG. 6 may be carried out by a service provider backend in conjunction with a user device and may result in predicting when a primary digital communication channel has become broken and fixing that primary communication channel. At step 610, the service provider backend may attempt to send a push notification to a user device through a primary and/or preferred communication channel. The push notification may be sent directly to the display of a user device, or alternatively received by a service provider application and then sent from the service provider application to the displayed on the user device. The push notification may also trigger an alert on the phone, either an auditory alert or a vibration, depending on user settings within the phone. The push notification may function similar to a text message in that the notification may appear on the user device and trigger the alert even if the screen is turned off. The push notification may also differ from traditional text messages in the size, shape, and/or color of the displayed dialogue box on the user device. The push notification may also utilize a different audible or vibrational alert, which may be customized to specifically distinguish it from a standard text message.

At step 620, service provider backend may receive indicia that the user failed to receive the push notification. After attempting to send the push notification to the user device, the service provider backend may expect an acknowledgement of receipt, or some other action based on the content of the push notification. For example, if the service provider is a financial entity, then the communication could range from low priority to high priority, or some other relative ranking system could be employed. A low priority communication may include an offer for a product or service, general information, news, etc. A high priority communication could relate to suspected fraud, transaction confirmation, etc. There could be communications that fall in between low and high priority. For example, a communication about a payment due date may be of intermediate priority. In the event of a high priority communication, the service provider backend may expect to receive some sort of response or feedback. In the event of a low priority communication, the service provider backend may not expect a response or feedback, but may be able to monitor whether the user has interacted with the message, either the push notification or within the service provider application. These indicia may include a lack of interaction with the push notification (e.g., opening, dismissing, etc.). The indica may also include a lack of interaction with the push notification within the service provider application, or with the service provider application generally. Any lack of confirmation of receipt may constitute an indica that the communication was not received by the User.

At step 630, the service provider backend may compare the indicia to a set of predefined rules. The service provider backend may maintain a set of rules helping to define when a preferred communication channel might be broken. For example, it may be a rule that if a high priority communication, such as a fraud notice, is not acknowledged and/or the user does not actively respond within a set time frame, then the communication channel is assumed to be non-functional. In another embodiment, the rules may require lack of response to a high priority communication some predefined number of times before ruling a communication channel broken. The rules may also dictate what communication are considered high priority, as opposed to low, intermediate, or any other number of relative gradations. The rules may also determine when a communication channel is considered broken based on lower priority communications. For instance, it may be a rule that for low priority communications, there must be multiple such communications without any user interaction before a communication channel is considered broken. The rule may also impose time-based factors on the determination such as lack of interaction with some number of low priority communications over a defined time period which could be weeks, months, etc. These rules are merely exemplary and not intended to be limiting.

The service provider backend may apply the set of rules to the indica received from monitoring user device at step 620. In a simplistic example, the push notification sent at step 610 might be a fraud-based transaction verification notification and the user of the user device does not interact, acknowledge, or respond to the push notification. The rule set may include a rule requiring that fraud-based transaction verification notifications must be responded to within 10 minutes. Under this hypothetical set of circumstances, after 10 minutes has elapsed without user response, the service provider backend would determine that the primary communication channel with the user device is broken. Other rules, scenarios, and applications of the scenarios to the rules may exist.

Once the service provider backend has determined that the preferred communication channel is broken with respect to the user device, then at step 640, service provider backend may attempt active communication with the user through secondary channels. There are many potential root causes for a broken communication channel. These root causes may include that the user has acquired a different phone, changed SIM cards (e.g., changed phone number), lost login credentials and has been locked out of the service provider application, has deleted the service provider application (presumably inadvertently), or any other circumstance that might lead to a breakdown in a preferred communication channel. The potential reasons for the broken communication channel may inform the attempted communication through secondary channels. These secondary channels may include email, text message (SMS), phone call, etc. In one embodiment, if the service provider backend believes the root cause of the broken communication channel is due to deletion of the service provider application, then the secondary communication may be sent via email, text message, etc. In another embodiment where the service provider backend believes that the user might have changed his or her phone number, then an email may be sent instead of a text message. The service provider backend may attempt all secondary communication channels or some portion thereof, depending on circumstances and/or rules.

The communication attempt may include the content of the push notification sent through the primary communication channel at step 610, but the communication attempt may also be different. The communication attempt may not focus on the purpose of the initial push notification at step 610, instead, the communication attempt at step 640 may be focused on reestablishing a verified/confirmed communication channel with the user. For example, the communication attempt at step 640 may include an email to the user with an explanation of the broken primary communication channel, and a request to repair that primary communication channel. The email may include one or more links acting as shortcuts to help reestablish the primary communication channel. A link may be to the service provider website, it may be to a web page with instructions for reestablishing the primary communication channel. Links sent in communication attempts at step 640 may include some level of pre-authorization depending on a confidence factor associated with the communication. For instance, a link provided in a communication attempt may pre-authorize the user so that when the link is clicked, the user is granted immediate access to his or her accounts. In some embodiments where there is suspicion that a user's phone number may be compromised, then this type of link would not be sent via text message but might be sent to an email address. The opposite is true in circumstances where there is concern that an email address may be outdated or compromised. Just as the attempted secondary communication channel(s) may be informed by the perceived cause of the broken primary communication channel, so too might the content of the communication be informed by the perceived cause of the broken communication channel. For instance, if the service provider backend suspects that the user may have deleted the service provider application from the user device, then the communication may include instructions to download the app or even a link that may initiate app download.

At step 650, the service provider backend may receive user feedback from the secondary communication attempt. This feedback may include some form of assent or assurance that the preferred communication method is functioning and/or reliable. For example, the feedback may be an acknowledgement of receipt of the initial push notification sent at step 610. The feedback may also include confirmation of re-downloading the service provider application or updating account information to include a new phone number, email, or other contact information. The feedback may include acknowledgement of a test message sent over the primary communication method.

Once the service provider backend is confident that the preferred communication channel is functioning, then at step 660, the service provider backend considers the primary communication method reestablished and begins re-sending communications to the user device through the preferred communication channel.

Figure 7:
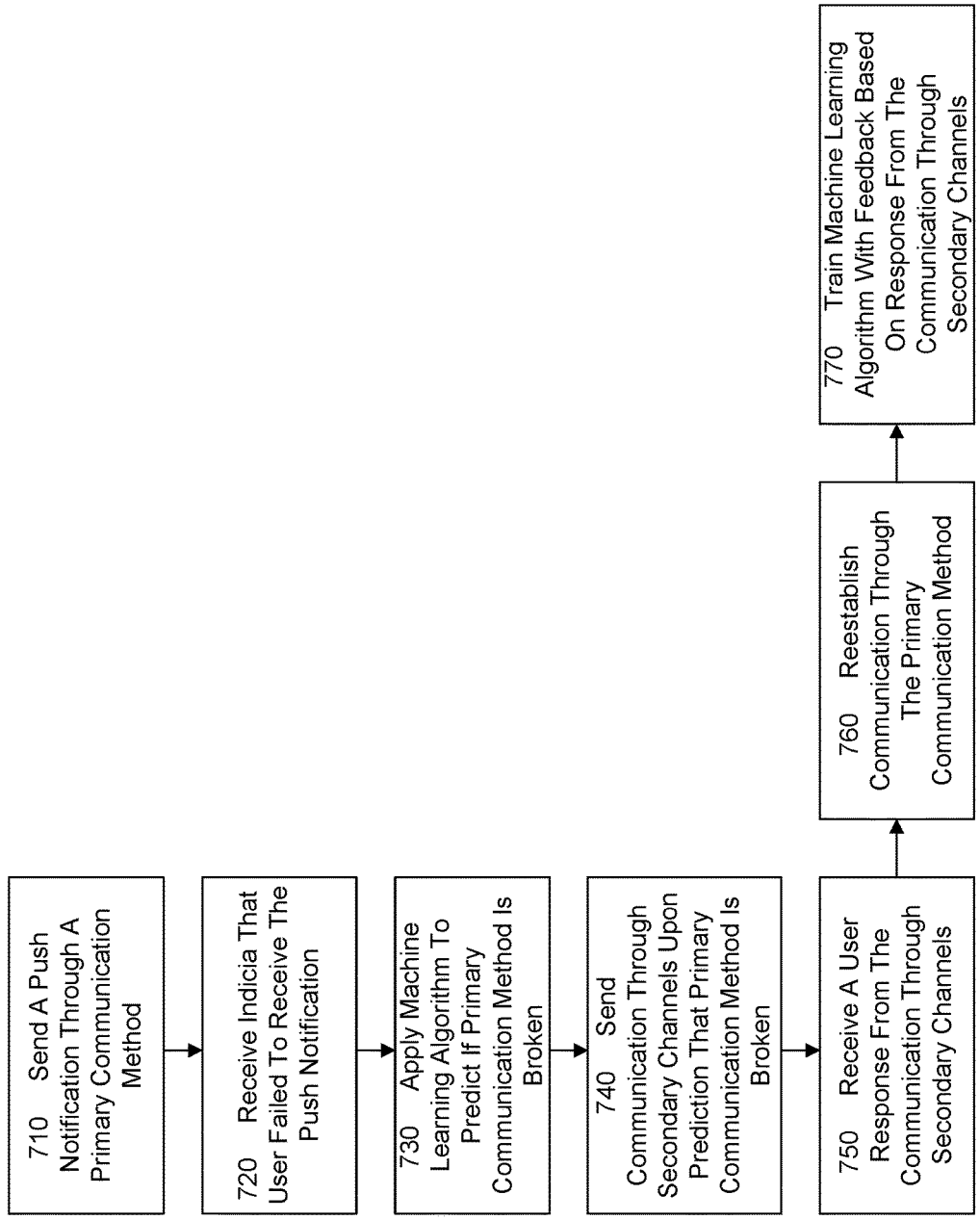
FIG. 7 is a flow diagram illustrating a method of detecting and repairing loss of a primary digital communication channel according to an embodiment of the invention.

FIG. 7 illustrates an exemplary method for detecting and repairing the loss of a primary digital communication channel with a customer according to an embodiment of the invention. The actions of the method depicted in FIG. 7 may be carried out by a service provider backend in conjunction with a user device and may result in predicting when a primary digital communication channel has become broken and fixing that primary communication channel. At step 710, the service provider backend may attempt to send a push notification to a user device through a primary and/or preferred communication channel. The push notification may be sent directly to the display of a user device, or alternatively received by a service provider application and then sent from the service provider application to the displayed on the user device. The push notification may also trigger an alert on the phone, either an auditory alert or a vibration, depending on user settings within the phone. The push notification may function similar to a text message in that the notification may appear on the user device and trigger the alert even if the screen is turned off. The push notification may also differ from traditional text messages in the size, shape, and/or color of the displayed dialogue box on the user device. The push notification may also utilize a different audible or vibrational alert, which may be customized to specifically distinguish it from a standard text message.

At step 720, service provider backend may receive indicia that the user failed to receive the push notification. After attempting to send the push notification to the user device, the service provider backend may expect an acknowledgement of receipt, or some other action based on the content of the push notification. For example, if the service provider is a financial entity, then the communication could range from low priority to high priority, or some other relative ranking system could be employed. A low priority communication may include an offer for a product or service, general information, news, etc. A high priority communication could relate to suspected fraud, transaction confirmation, etc. There could be communications that fall in between low and high priority. For example, a communication about a payment due date may be of intermediate priority. In the event of a high priority communication, the service provider backend may expect to receive some sort of response or feedback. In the event of a low priority communication, the service provider backend may not expect a response or feedback but may be able to monitor whether the user has interacted with the message, either the push notification or within the service provider application. These indicia may include a lack of interaction with the push notification (e.g., opening, dismissing, etc.). The indica may also include a lack of interaction with the push notification within the service provider application, or with the service provider application generally. Any lack of confirmation of receipt may constitute an indica that the communication was not received by the User.

At step 730, the service provider backend may employ a learning algorithm implemented by a processor associated with the service provider backend to predict when a preferred communication channel might be broken. The service provider backend may store historical user interaction habits in a database connected to the learning algorithm. The historical user interaction habits may help the learning algorithm to predict when a preferred communication channel might be broken. For example, if a user always responds to a certain type of push notification, then a lack of response may be interpreted by the learning algorithm as a result of a broken communication channel. The analysis may be more complex. For example, the learning algorithm may consider the importance of the push notification, how much data is contained in the user's historical actions (e.g., how many datapoints), etc. The learning algorithm may weight each factor and make predictions based on a complex analysis of all factors and feedback from previous predictions. In some embodiments, the learning algorithm may consider instances where there is no confirmation of a user receiving a push notification, where there is a suspicious confirmation, where logins associated with the user's service provider application account originate from a device not associated with the user or a different phone number, etc. As noted, the learning algorithm may weigh different types of push notifications differently. For example, fraud notifications may be considered more important than advertising or simple informational notifications and may be weighed more heavily. Other types of notifications, such as billing info and the like, may be considered and weighed based on perceived importance by the learning algorithm. The learning algorithm may be capable of providing accurate predictions based on incomplete and/or uncertain information. For example, a push notification may be sent regarding an upcoming bill payment due date. Historical user interaction history may indicate that about 25% of the time, a given user specifically acknowledges these billing notifications, and 50% of the time, the user pays the bill within 24 hours of receiving the notification. In an instance where a billing notification is sent and the service provider backend receives indicia indicating that there was no interaction with the push notification and no bill payment 36 hours post notification, the learning algorithm must determine if the communication channel is broken. The learning algorithm must predict if the user did not receive the notification, or if the user did not interact with the notification and did not pay the bill for any number of other potential reasons. In making a prediction, the learning algorithm may consider any and all data available. For instance, the learning algorithm may consider what the 25% notification acknowledgement rate looks like over time. Was the rate 100% a year ago dropping to 0% more recently and the average over the time period is 25%? Was the rate 0% a year ago and ramping up to 100% more recently with the average over the time period equaling 25%? These two cases might be treated differently by the learning algorithm. The same is true of any other available data, the learning algorithm may dive down and try to better understand what the data is likely indicating prior to making a prediction. In this way, the learning algorithm may establish one or more relationships between different and seemingly unrelated pieces of information, and therefore be able to create dependencies and consider factors that are not visible to humans. The learning algorithm may be able to test these relationships and analyses based on these relationships through feedback on predictions over time. In some embodiments, there may be a hybrid approach where some number of baseline rules are programmed and then the learning algorithm operates and makes predictions on top of that baseline set of rules. The baseline set of rules may include rules when the system must, or must not, conclude that a preferred communication channel is broken.

Once the service provider backend has determined that the preferred communication channel is broken with respect to the user device, then at step 740, service provider backend may attempt active communication with the user through secondary channels. There are many potential root causes for a broken communication channel. These root causes may include that the user has acquired a different phone, changed SIM cards (e.g., changed phone number), lost login credentials and has been locked out of the service provider application, has deleted the service provider application (presumably inadvertently), or any other circumstance that might lead to a breakdown in a preferred communication channel. The potential reasons for the broken communication channel may inform the attempted communication through secondary channels. These secondary channels may include email, text message (SMS), phone call, etc. In one embodiment, if the service provider backend believes the root cause of the broken communication channel is due to deletion of the service provider application, then the secondary communication may be sent via email, text message, etc. In another embodiment where the service provider backend believes that the user might have changed his or her phone number, then an email may be sent instead of a text message. The service provider backend may attempt all secondary communication channels or some portion thereof, depending on circumstances and/or rules.

The communication attempt may include the content of the push notification sent through the primary communication channel at step 710, but the communication attempt may also be different. The communication attempt may not focus on the purpose of the initial push notification at step 710, instead, the communication attempt at step 740 may be focused on reestablishing a verified/confirmed communication channel with the user. For example, the communication attempt at step 740 may include an email to the user with an explanation of the broken primary communication channel, and a request to repair that primary communication channel. The email may include one or more links acting as shortcuts to help reestablish the primary communication channel. A link may be to the service provider website, it may be to a web page with instructions for reestablishing the primary communication channel. Links sent in communication attempts at step 740 may include some level of pre-authorization depending on a confidence factor associated with the communication. For instance, a link provided in a communication attempt may pre-authorize the user so that when the link is clicked, the user is granted immediate access to his or her accounts. In some embodiments where there is suspicion that a user's phone number may be compromised, then this type of link would not be sent via text message but might be sent to an email address. The opposite is true in circumstances where there is concern that an email address may be outdated or compromised. Just as the attempted secondary communication channel(s) may be informed by the perceived cause of the broken primary communication channel, so too might the content of the communication be informed by the perceived cause of the broken communication channel. For instance, if the service provider backend suspects that the user may have deleted the service provider application from the user device, then the communication may include instructions to download the app or even a link that may initiate app download.

At step 750, the service provider backend may receive user feedback from the secondary communication attempt. This feedback may include some form of assent or assurance that the preferred communication method is functioning and/or reliable. For example, the feedback may be an acknowledgement of receipt of the initial push notification sent at step 710. The feedback may also include confirmation of re-downloading the service provider application or updating account information to include a new phone number, email, or other contact information. The feedback may include acknowledgement of a test message sent over the primary communication method.

Once the service provider backend is confident that the preferred communication channel is functioning, then at step 760, the service provider backend considers the primary communication method reestablished and begins re-sending communications to the user device through the preferred communication channel.

At step 770, the learning algorithm is trained with feedback based on response from the communication through secondary channels. The feedback is provided to the learning algorithm to train, further refine, and improve the learning algorithm. The user feedback data may help train the learning algorithm in a variety of different ways. For example, if the user feedback is an affirmation that the initial push notification sent at step 710 was received and simply ignored, then the learning algorithm will be able to refine the predictions and change/optimize the weighting and relationships that led to the incorrect prediction. The same may be true for feedback indicating that the learning algorithm correctly predicted that the communication channel was broken. The feedback may help refine future predictions because the root cause of the broken communication channel may have been predicted incorrectly, so it is possible that the learning algorithm got the correct result for the wrong reasons. In that case, the feedback is useful to train the learning algorithm. In the event that the algorithm predicted correctly, and the prediction was based on a correct analysis, the learning algorithm may use the feedback to further reinforce the correct analysis. This may include changing weighting for factors that more strongly favor the correct analysis, etc. With continued feedback and training of the learning algorithm over time, the learning algorithm may not only become more accurate, but also more efficient. This is because less computing resources are required as the machine learning algorithm becomes more confident in its predictions. Thus, not only is the accuracy of the predictions improved over time, but the functioning of the computer is also improved over time as the learning algorithm is trained.

It is further noted that the systems and methods described herein may be tangibly embodied in one or more physical media, such as, but not limited to, a compact disc (CD), a digital versatile disc (DVD), a floppy disk, a hard drive, read only memory (ROM), random access memory (RAM), as well as other physical media capable of data storage. For example, data storage may include random access memory (RAM) and read only memory (ROM), which may be configured to access and store data and information and computer program instructions. Data storage may also include storage media or other suitable type of memory (e.g., such as, for example, RAM, ROM, programmable read-only memory (PROM), erasable programmable read-only memory (EPROM), electrically erasable programmable read-only memory (EEPROM), magnetic disks, optical disks, floppy disks, hard disks, removable cartridges, flash drives, and any type of tangible and non-transitory storage medium), where the files that comprise an operating system, application programs including, for example, web browser application, email application and/or other applications, and data files may be stored. The data storage of the network-enabled computer systems may include electronic information, files, and documents stored in various ways, including, for example, a flat file, indexed file, hierarchical database, relational database, such as a database created and maintained with software from, for example, Oracle® Corporation, Microsoft® Excel file, Microsoft® Access file, a solid state storage device, which may include a flash array, a hybrid array, or a server-side product, enterprise storage, which may include online or cloud storage, or any other storage mechanism. Moreover, the figures illustrate various components (e.g., servers, computers, processors, etc.) separately. The functions described as being performed at various components may be performed at other components, and the various components may be combined or separated. Other modifications also may be made.

It will be readily understood by those persons skilled in the art that the present invention is susceptible to broad utility and application. Many embodiments and adaptations of the present invention other than those herein described, as well as many variations, modifications and equivalent arrangements, will be apparent from or reasonably suggested by the present invention and foregoing description thereof, without departing from the substance or scope of the invention.

We claim:

1. A method for detecting and repairing loss of a primary digital communication channel, comprising:
    sending a push notification to an application of a user device over a network from a server;
    receiving, by the server and in response to the sending of the push notification, push notification status data, the push notification status data comprising user push notification interaction information;
    applying, by the server, a predictive model to determine that the primary digital communication channel has failed based on the push notification and the push notification status data;
    transmitting, based on the determination by the predictive model, a communication to a user for the user device over one or more alternative digital communication channels, the communication comprising a link to reestablish communication through the application;
    receiving, by the server, a user response to the transmitting of the communication over the one or more alternative digital communication channels comprising an assent that the primary digital communication channel is functioning; and
    reestablishing, based on the user response, the primary digital communication channel;
    wherein:
        the server is further configured to generate a confidence interval that each of the one or more alternative digital communication channels is associated with the user using the predictive model based on the push notification status data,
        the one or more alternative digital communication channels includes a transmission of a communication to a second user device, and
        the communication comprises the transmission of an expiring token to a device of the user for logging into the application on the second user device without providing credentials when the confidence interval exceeds a threshold value.

2. The method of claim 1, wherein the one or more alternative digital communication channels includes transmitting a communication to a second user device.

3. The method of claim 1, wherein the one or more alternative digital communication channels is one selected from a group of an email and a text message.

4. The method of claim 1, wherein the push notification status data comprises a not-received status, a received and read status, and a received and not-read status.

5. The method of claim 4, wherein the push notification status data includes data indicative of previous statuses of the user.

6. The method of claim 1, wherein the push notification status data specifies a user device of the user.

7. The method of claim 1, wherein the predictive model is trained with the feedback from the user.

8. The method of claim 1, wherein the communication includes an indication of a notification included in the push notification.

9. The method of claim 1, wherein the communication includes a download link for downloading the application.

10. The method of claim 9, wherein the communication includes a message querying the user if the user device is active.

11. A system for detecting and repairing loss of a primary digital communication channel, comprising:
a server comprising at least one processor; and
a user device;
wherein the server is configured to:
- send a push notification to an application of the user device over a network,
- receive, in response to the sending of the push notification, push notification status data, the push notification status data comprising user push notification interaction information,
- apply a predictive model to determine that the primary digital communication channel has failed based on the push notification and the push notification status data;
- transmit, based on the determination by the predictive model, a communication to a user for the user device over one or more alternative digital communication channels, the communication comprising a link to reestablish communication through the application;
- receive a user response to the transmitting of the communication over the one or more alternative digital communication channels comprising an assent that the primary digital communication channel is functioning; and
- reestablish, based on the user response, the primary digital communication channel;

wherein:
- the server is further configured to generate a confidence interval that each of the one or more alternative digital communication channels is associated with the user using the predictive model based on the push notification status data,
- the one or more alternative digital communication channels includes a transmission of a communication to a second user device, and
- the communication comprises the transmission of an expiring token to a device of the user for logging into the application on the second user device without providing credentials when the confidence interval exceeds a threshold value.

12. The system of claim 11, wherein the second user device is an internet of things (IoT) device.

13. The system of claim 12, wherein the server is further configured to determine a type of the second device based on a reply transmitted by the user using the one or more alternative communication channels.

14. The system of claim 12, wherein the server is further configured to determine a status of the application on the second device based on a reply transmitted by the user using the alternative communication channel.

15. The system of claim 11, wherein the server is further configured to alter a default communication channel based on a reply transmitted by the user using the alternative communication channel.

16. The system of claim 11, wherein the server is further configured to report suspicious activity to an institution associated with the user.

17. A non-transitory computer-accessible medium comprising instructions for execution by a processor, wherein, upon execution of the instructions, the processor is configured to perform procedures comprising:
- sending a push notification to an application of a user device over a network,
- receiving, in response to the sending of the push notification, push notification status data, the push notification status data comprising user push notification interaction information,
- applying a predictive model to determine that a primary digital communication channel has failed based on the push notification and the push notification status data;
- transmitting, based on the determination by the predictive model, a communication to a user for the user device over one or more alternative digital communication channels, the communication comprising a link to reestablish communication through the application;
- receiving, by the server, a user response to the transmitting of the communication over the one or more alternative digital communication channels comprising an assent that the primary digital communication channel is functioning;
- reestablishing, based on the user response, the primary digital communication channel;

wherein:
- the server is further configured to generate a confidence interval that each of the one or more alternative digital communication channels is associated with the user using the predictive model based on the push notification status data,
- the one or more alternative digital communication channels includes a transmission of a communication to a second user device, and
- the communication comprises the transmission of an expiring token to a device of the user for logging into the application on the second user device without providing credentials when the confidence interval exceeds a threshold value.

* * * * *